July 29, 1941.  B. H. EVANS  2,250,825
HOIST
Filed March 15, 1940  2 Sheets-Sheet 1
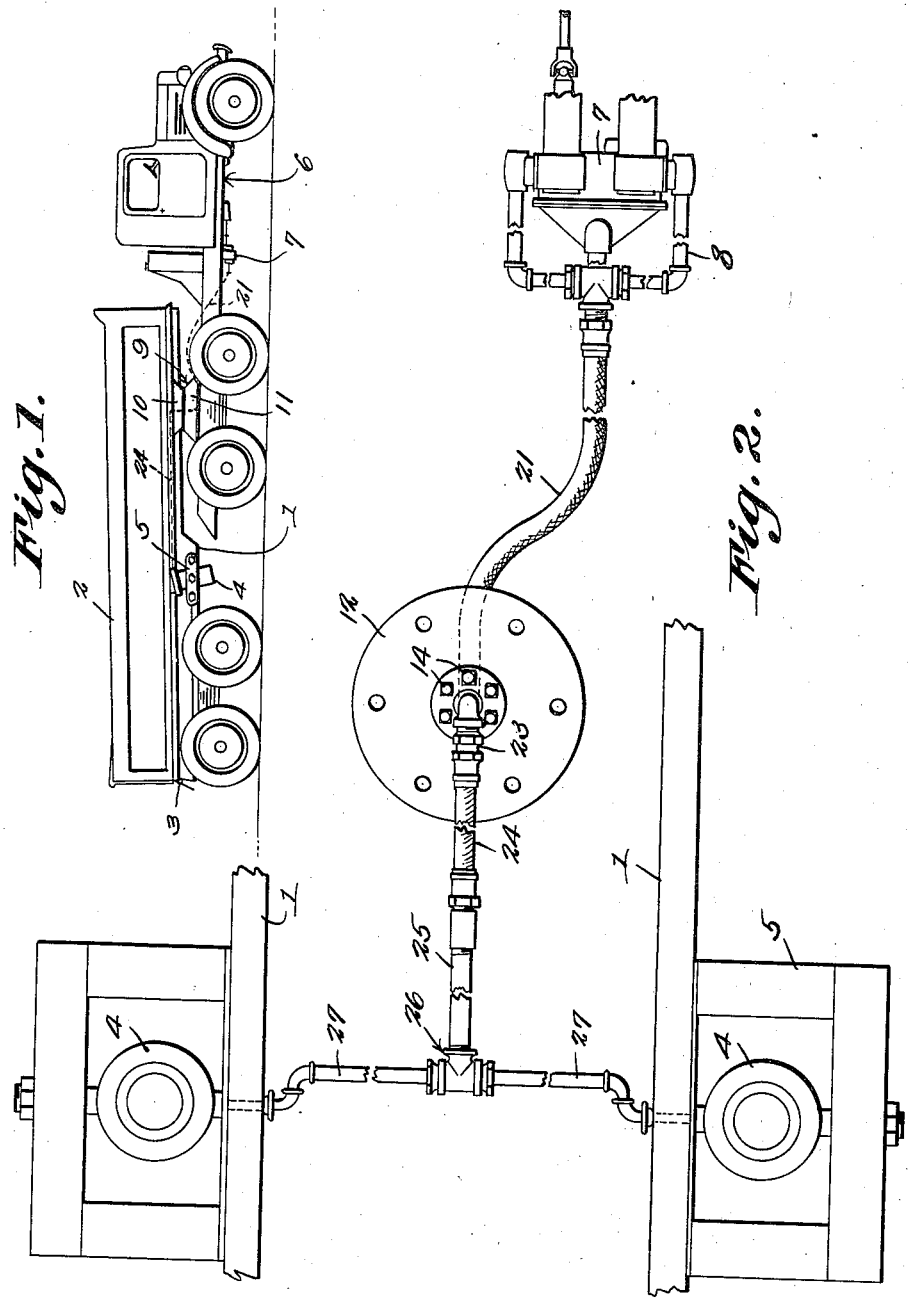
B. H. Evans INVENTOR.
BY C. A. Snow & Co.
ATTORNEYS.

July 29, 1941.  B. H. EVANS  2,250,825
HOIST
Filed March 15, 1940  2 Sheets-Sheet 2
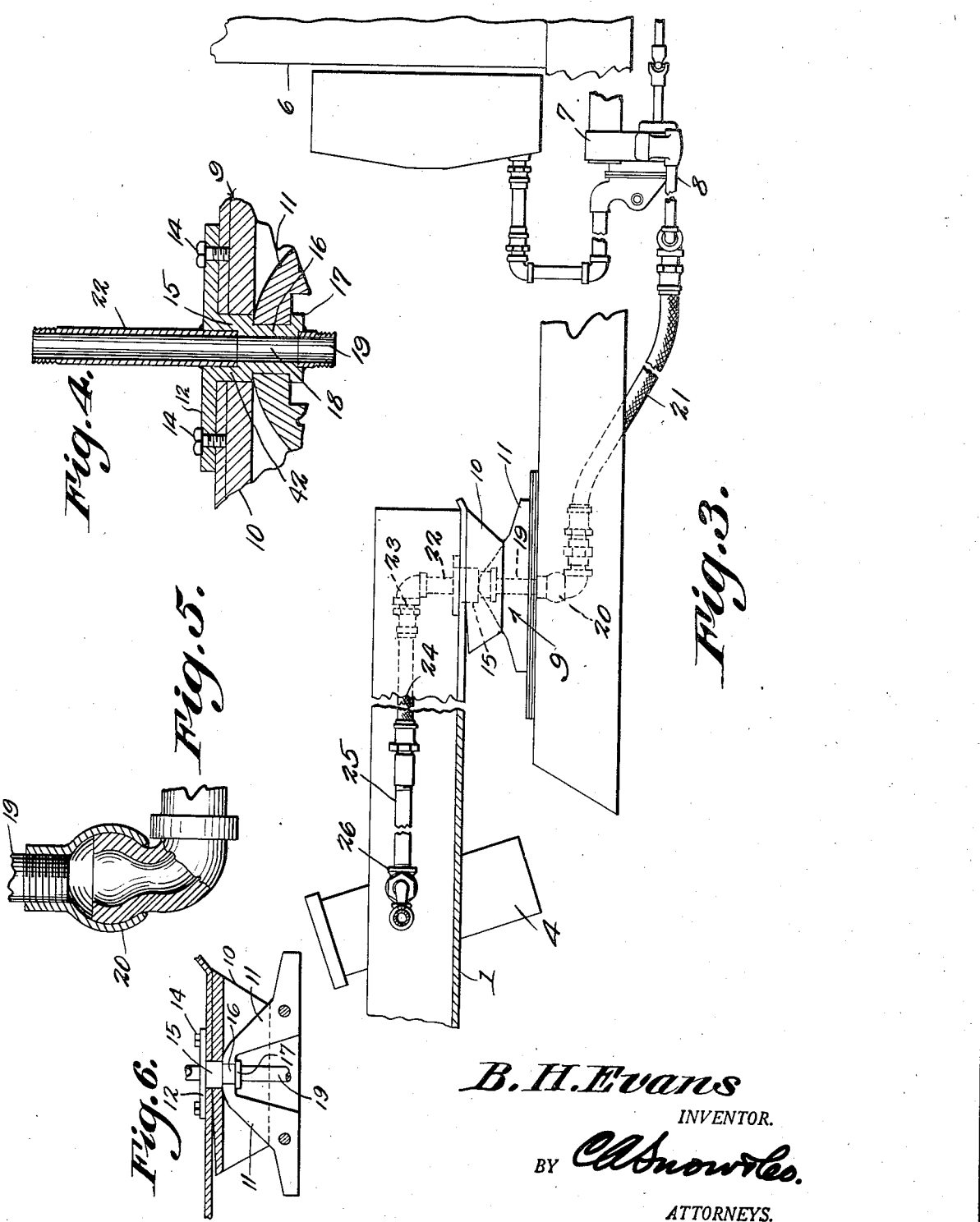
B. H. Evans
INVENTOR.
BY CA Snowles
ATTORNEYS.

Patented July 29, 1941

2,250,825

UNITED STATES PATENT OFFICE 2,250,825

HOIST

Boyd Hugh Evans, South San Francisco, Calif.

Application March 15, 1940, Serial No. 324,213

1 Claim. (Cl. 298—22)

This invention relates to a dumping vehicle, comprising a wheel mounted frame, a body hinged to the frame, and fluid pressure mechanism for swinging the body vertically, to and from dumping position.

The present invention aims to provide a novel means whereby pressure may be conducted to said mechanism, through a king pin that connects the dumping vehicle with a tractor, it being unnecessary to resort to transfer gear boxes, a long swinging hose, and other unsatisfactory expedients or inventions proposed heretofore.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows, diagrammatically, a device constructed in accordance with the invention and connected to a tractor;

Fig. 2 is a top plan, wherein parts are broken away;

Fig. 3 is a side elevation wherein parts are broken away;

Fig. 4 is a vertical sectional view of the king pin and associated parts;

Fig. 5 is a sectional view of the ball joint used in the pressure line;

Fig. 6 is a sectional view, showing the lower member of the fifth wheel mechanism, and associated parts.

The numeral 1 marks the wheel-mounted frame of a dumping vehicle, whereunto a body or carrier 2 is hinged at 3, for raising and lowering. The raising and lowering of the body 2 is brought about through the instrumentality of a fluid pressure mechanism, including cylinders 4, pivotally mounted in offsets 5 on the frame 1, the pistons of the cylinders being operatively assembled with the body 2 in a well known manner.

The numeral 6 designates a truck or tractor, carrying a pump 7, the pump line being marked by the numeral 8. The frame 1 of the dumping vehicle is connected to the platform of the tractor 6 by a fifth wheel mechanism 9, including an upper member 10 carried by the frame 1 of the dumping vehicle, and a lower member 11 carried by the platform of the tractor 6, the lower member 11 comprising laterally-separable parts.

The structure hereinbefore described is known in the art and no novelty is attributed to it, saving insofar as it may enter into patentable cooperation with parts hereinafter described.

The king pin of the fifth wheel mechanism 9 is tubular and includes a disk-like head 12, attached by securing elements 14 to the upper member 10 of the fifth wheel mechanism 9, the body 15 of the king pin being received in the member 10 of the fifth wheel mechanism. The body 15 of the king pin has a reduced neck 16, received in the laterally separable parts of the lower member 11 of the king pin, and forming a flange 17 engaged under the upper portions of said laterally-separable parts.

The king pin has a vertical bore 18 in the lower end of which is secured a pipe 19, connected by a ball and socket coupling 20 to a flexible hose 21, operatively connected with the pump line 8.

A pipe 22 is secured in an enlarged recess 42 in the head 12 and in the body 15 of the king pin, and to it is joined, by suitable connections 23, a flexible pipe or tube 24 joined to the shank 25 of a T-shaped conduit member 26, the lateral branches 27 of which extend through the sides of the frame 1 and are in communication with the cylinders 4 of the raising and lowering mechanism.

The hydraulic pressure produced by the pump 7 is transmitted through the pump line 8, the hose 21, the coupling 20, the second pipe 19, the bore 18 of the king pin, the first pipe 22, the connections 23, the pipe or hose 24, the shank 25 of the conduit member 26, and the branches 27 to the raising and lowering cylinders 4.

The device forming the subject matter of this application is simple in construction, but it affords an effective means for transferring hydraulic pressure from the pump 7 to the place of application, to wit, the cylinders 4. The mechanism will work in a satisfactory way even though there may be frame distortion or other irregularities due to rough and uneven roads. The device is substantial, well adapted to withstand hard use, and calls for no high grade labor in making repairs. It is obvious that the structure shown in Fig. 2 of the drawings can be duplicated, should conditions require.

Having thus described the invention, what is claimed is:

In a device of the class described, a towed vehicle embodying a frame, a dumping carrier mounted on the frame, a fifth wheel mechanism comprising an upper member mounted on the frame, a tubular king pin provided at its upper end with a laterally enlarged head disposed on top of the upper member, securing means connecting the head with the upper member, the king pin comprising a body of the same length as the thickness of the upper member and extended therethrough, the body being reduced in diameter to form a neck located immediately below the lower surface of the upper portion of the upper member, and to form a flange at the lower end of the neck, the fifth wheel mechanism comprising a laterally separable lower member carried by a towing vehicle and engaging the neck, above the flange, a first pipe section mounted in the head and in the body, and a second pipe section mounted in the lower end of the neck, within the flange, the pipe sections and the tubular king pin constituting part of a lifting and dumping conduit for the carrier.

BOYD HUGH EVANS.